No. 730,476. PATENTED JUNE 9, 1903.
D. G. RODGERS.
LOOM PICKER.
APPLICATION FILED OCT. 4, 1901.
NO MODEL.

Witnesses
J. M. Fowler Jr.
D. E. Wilson.

Inventor
David G. Rodgers,
by W. A. Redmond
Attorney

No. 730,476. Patented June 9, 1903.

UNITED STATES PATENT OFFICE.

DAVID G. RODGERS, OF PATERSON, NEW JERSEY.

LOOM-PICKER.

SPECIFICATION forming part of Letters Patent No. 730,476, dated June 9, 1903.

Application filed October 4, 1901. Serial No. 77,566. (No model.)

*To all whom it may concern:*

Be it known that I, DAVID G. RODGERS, a citizen of the United States, residing at Paterson, in the county of Passaic and State of New Jersey, have invented certain new and useful Improvements in Loom-Pickers; and I do declare the following to be a full, clear, and exact description of the invention, such as will enable others skilled in the art to which it appertains to make and use the same.

This invention relates generally to looms and particularly to improvements in loom-pickers; and it has for its object to provide a picker the parts of which may be quickly and inexpensively renewed when worn or damaged; and it consists in the parts and combinations of parts hereinafter described and claimed.

Figure 1:
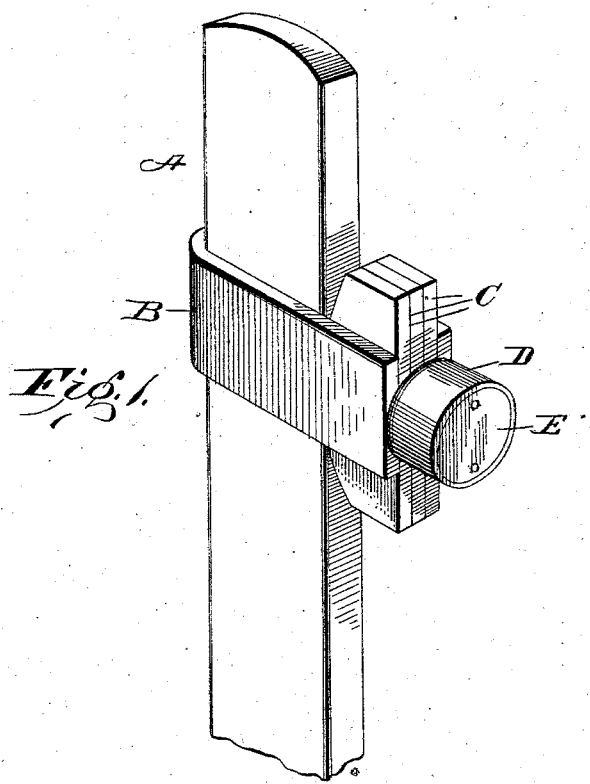
Figure 2:
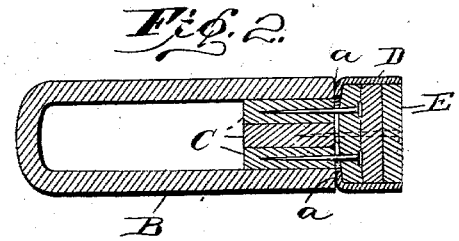

In the accompanying drawings, forming a part of this specification, Figure 1 is a perspective view of my improved picker in position on a picker stick or staff, and Fig. 2 a horizontal longitudinal central section through the picker.

The picker now commonly used consists of a strap of leather or rawhide bent on itself to form a loop and having riveted within the loop at one end a piece of leather or rawhide. This form of picker is objectionable, because the constant impact of the shuttle soon wears a jagged hole in the strap, and when so worn it becomes useless and must be replaced by an entirely-new picker, since there is no way in which the worn part can be removed and a new part substituted. My invention consists in providing a receptacle to hold the material with which the shuttle contacts, which receptacle is removably secured to the picker-strap and is adjustable therewith on the picker staff or stick and within which the material is removably secured, so that the material may be easily removed when worn and new material substituted.

Referring to the drawings, A represents a picker staff or stick, which may be of the usual or any desired form. The picker consists of the strap B, of leather or rawhide, which, it will be observed, is merely bent or doubled once to form a loop for the reception of the picker staff or stick. Between the ends of the strap is secured in any preferred manner the strips of leather or rawhide C in sufficient number to correspond with the thickness of the staff or stick A, said strips C being curved at their rear edges, as shown, so that they bear only at their central or middle portions on the edge of the stick or staff and at a point directly in line with the line of shock resulting from the impact of the shuttle with the picker. The curved faces also serve to permit of the ready insertion of the stick in the loop and to bind the picker to said stick.

D represents the receptacle for the material against which the shuttle strikes, and which receptacle is shown in the shape of a cylinder, but which may be of any other preferred form. As shown, the receptacle is shaped like a ferrule and at one end is formed with an inwardly-extending flange $a$, on which rests the first of a series of disks E, of leather or rawhide, and through which first disk a couple of nails are driven into the strips C in order to secure the receptacle in place, the nails serving to hold the said disk to the strips, and the disk, by reason of its resting on the flange $a$, securing the receptacle in its proper position. A sufficient number of disks are inserted in the receptacle to fill it, and they are secured in place by tacks or nails, which may be readily withdrawn when it is desired to renew the disks.

Thus it will be observed that I provide a picker which is practically indestructible from use, since its expensive parts are not affected by use and the cheaper or least expensive parts which are worn in use are easily removable for renewal.

Having thus described my invention, what I claim as new, and desire to secure by Letters Patent, is—

1. A loom-picker comprising a strap formed to receive the picker staff or stick, strips of suitable material, such as rawhide or leather, secured between the ends of the strap, a receptacle for the impact material and suitable impact material arranged within said receptacle, and means for removably securing the impact material and the receptacle to the strips.

2. A loom-picker consisting of a strap formed to receive the picker staff or stick, strips of suitable material having a curved rear edge secured between the ends of said strap, a receptacle for the picker material having an inwardly-extending flange at one end, a piece of leather or rawhide fitting over said flange and adapted to be fastened to said curved strips to secure the receptacle thereto, and suitable picker material removably secured within said receptacle.

In testimony whereof I affix my signature in presence of two witnesses.

DAVID G. RODGERS.

Witnesses:
ALEX. RODGERS,
CLARENCE G. WATKINS.